Feb. 11, 1958     H. M. ARCHER     2,823,154
SPIRAL WINDING PROCESS AND APPARATUS THEREFOR
Filed Dec. 12, 1955     2 Sheets-Sheet 1

INVENTOR.
HUGH M ARCHER

Feb. 11, 1958 H. M. ARCHER 2,823,154
SPIRAL WINDING PROCESS AND APPARATUS THEREFOR
Filed Dec. 12, 1955 2 Sheets-Sheet 2
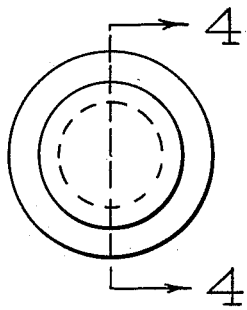
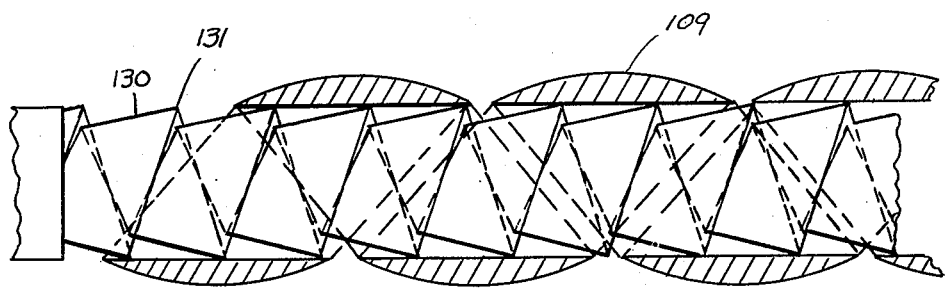
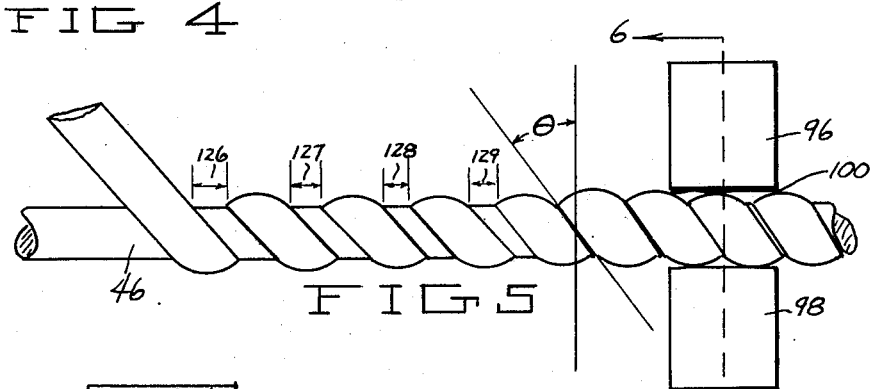
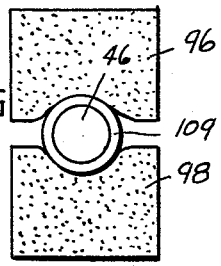
*INVENTOR.*
HUGH M ARCHER

United States Patent Office 2,823,154
Patented Feb. 11, 1958

2,823,154

SPIRAL WINDING PROCESS AND APPARATUS THEREFOR

Hugh M. Archer, Dearborn, Mich.

Application December 12, 1955, Serial No. 552,413

15 Claims. (Cl. 154—2.26)

The present invention relates to a device for winding plastic spirals of the type commonly used to cover cords or wires and thereby to accomplish a decorative objective or to provide physical protection to the cord, wire, or similarly shaped device.

An object of this invention is to provide a method and means for the manufacture of the plastic spirals in as completely an automatic fashion as possible.

A second object of this invention is to provide a machine for winding plastic spirals that can be adjusted to wind spirals of diverse diameters.

A third object of this invention is to provide a plastic spiral winding machine that can wind said spirals out of different cross-sectional plastic strip material, as for example, cellulose acetate strip, without requiring major adjustment of the machine.

A fourth object of my invention is to provide a method and machine for winding said strip into spirals or coils reliably and constantly despite variations in the width of said strip caused by variations in extrusion characteristics at the time of extrusion.

Still another object of my invention is to provide a method and machine for the manufacture of a spiral or helix in which the mandrel on which the material is wound is removed from the spiral, or vice versa, as rapidly as the material is wound on the mandrel.

Another object of my invention is to provide means, in a machine for the production of spirals of diverse materials, for the continuous heating and cooling of the spiralled material in order to effect its heat treatment as desired at the will of the operator.

These and other objects of my invention will become clear as the description of my invention progresses. It is to be understood that the description that follows relates to a specific embodiment of my invention but such description is not to be considered as one that limits the scope and application of my invention since it will be obvious to one skilled in the mechanical arts that other applications of the philosophy of my invention exist.

In the manufacture of plastic or similar material coils, it is customary to wind the strip of plastic on a mandrel of the desired diameter and length by rotating the mandrel with an end of the strip clamped to the mandrel. The operator guides the strip with his fingers to prevent overlapping of adjacent turns. With the strip so wound on the mandrel, both ends are clamped to the mandrel to prevent the unwinding of the strip. The wound and clamped mandrel is then put in a heat treating oven which raises the temperature of the spiral material to that which relieves the internal stresses thus setting the material in the form of a spiral. The wound and clamped mandrel is then removed from the oven and permitted to cool. Once cool, the plastic spiral is removed from its mandrel and trimmed to the desired length. The mandrel is then returned to the winding operator for re-use. The mandrel is usually a smooth metal rod or cylinder of the desired diameter and having a length somewhat longer than the desired length of the finished product.

The foregoing description reveals the necessity for considerable manual labor in the production of said plastic spirals. Repeated attempts to make an automatic spiral winding machine have been more or less successful but have produced a machine that was either too expensive or required too much attention for its operation.

The spiral winding machine that I have invented is capable of running automatically for many hours without human attention while producing a uniform product of high quality.

For purpose of clarity in description, the several steps necessary for the production of plastic spiral will be listed below and then with the help of the diagrams and accompanying description the details of my invention will be made clear.

The steps for producing a plastic spiral usually include:

(1) The plastic strip is wound closely spaced on a mandrel.

(2) The strip while wound on the mandrel is heated to that temperature which relieves all strains in the plastic material.

(3) The heated plastic strip is cooled.

(4) The cooled and now firmly set plastic spiral is removed from the mandrel.

(5) The plastic spiral is cut to the desired length.

Referring now to the figures:

Figure 3 is an end view of the mandrel of my invention with plastic strip wound on it;

Figure 4 is a view taken along the line 4—4 of Figure 3, wherein the mandrel and the plastic strip is shown in cross-section;

Figure 5 is a side elevation showing in detail the relative position of the individual plastic coils along the length of the mandrel and associated apparatus; and Figure 6 is a cross-sectional view taken along the line 6—6 of Figure 5.

Figures 1, 2:
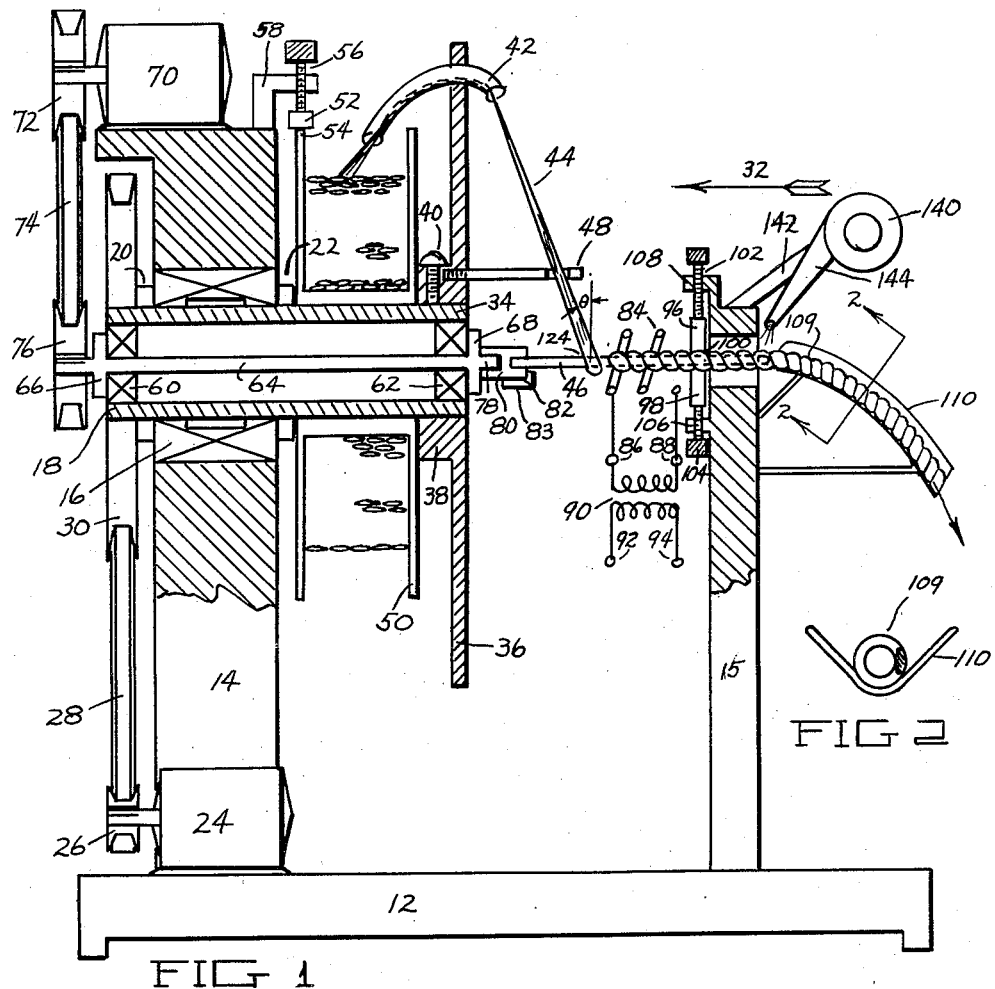
Figure 1 is an elevational view of a plastic spiral winding machine constructed according to the invention, with certain parts shown schematically for illustration purposes.
Figure 2 is a cross-sectional view of Figure 1 taken at the line 2—2 of Figure 1.

In order to clarify the description of my plastic spiral winding machine, I wish to explain in detail one step in the process, an understanding of which is essential before a thorough comprehension of my method for winding spirals can be realized. The step in question is the matter of the removal of the wound plastic spiral from the mandrel. If a left hand screw thread is machined on the surface of a round rod and then the threaded rod is wrapped with a strip of plastic or similar material in the opposite sense, i. e., a right hand spiral, the mandrel may be removed from its wrappings by rotating it in a clockwise direction relative to the wrappings. In so doing the mandrel performs both rotating motion and an axial motion of translation. These two motions may be considered independent and are relative to the wrapping. I have chosen to permit the mandrel to rotate relative to its wrappings but to be restrained from motion of translation relative to the machine, and, also to permit the wrappings to remain stationary in a rotary sense but to move with a translatory motion relative to the mandrel and machine. By so doing I can now permit the machine to wind the wrappings onto the mandrel at a fixed rate, and the mandrel to screw the wrappings off by the afore described process at the same rate. In experimenting with this process, I have discovered that the strip being wound on the mandrel must be maintained under tension if best operation is to be obtained.

Having thus described the critical step in my process for winding plastic and similar materials into spirals I will now describe the entire machine and set forth its several operating characteristics.

Referring to Figure 1, the machine base 12 is provided to support the several parts of the spiral winding machine. Supported by an extension 14 of base 12 is a long bearing 16 which rotatably supports hollow shaft 18. Hollow shaft 18 is restrained against axial motion by any suitable means such as collars 20 and 22 affixed to the hollow shaft 18. Hollow shaft 18 is rotated by means of motor 24, pulleys 26, belt 28 and pulley 30 fastened to hollow shaft 18. For purposes of description, I will state that under the compulsion of motor 24, hollow shaft 18 will be considered as rotating in a clockwise direction when viewed from the mandrel end of the machine, i. e., in the direction indicated by arrow 32. On hollow shaft 18 and at its end 34 opposite to that on which pulley 30 is attached, I have mounted a disc 36 which is herein called a winding disc. It is firmly attached to hollow shaft 18 by attachment collar 38 and set screw 40. Attached to winding disc 36 is a guide 42 through which the plastic strip 44 is led as it travels toward the mandrel 46. In addition to the guide 42, I have mounted a second guide or eyelet 48 through which the plastic strip 44 is also led.

The plastic strip 44 is wound on the spool 50. The spool 50 is rotatably mounted on hollow shaft 18 and is free to rotate thereon as dictated by rotating forces transmitted to the spool by the plastic strip 44. I have found it desirable to provide a brake on spool 50 in order to adjust the tension forces in plastic strip 44. The brake comprises a pad 52 of felt or suitable material pressed against rim 54 of spool 50 by screw 56 suitably supported by bracket 58.

The hollow shaft 18 is provided with internal bearings 60 and 62 which rotatably support a shaft 64. Axial motion of shaft 64 is prevented by thrust collars 66 and 68 which are attached firmly to shaft 64. Shaft 64 is rotated by motor 70 which is mechanically attached to shaft 64 by motor pulley 72, belt 74 and shaft pulley 76. The direction of rotation of shaft 64 is counter-clockwise when viewed in the direction indicated by arrow 32.

On the end 78 of shaft 64 is attached a chuck 80 which holds mandrel 46. The chuck 80 also supports knife 82 which is provided with a cutting edge 83 to cut the plastic strip 44 in case the plastic is not removed from the mandrel as rapidly as the strip is wound on the mandrel.

Co-axial to the mandrel 46 and situated approximately midway of its length is an electric heating coil 84. By means of terminals 86 and 88, the heating coil 84 is attached to a transformer which is shown symbolically at 90.

The terminals 92 and 94 of the transformer 90 are provided to facilitate connection of the transformer to the usual 115 volt, 60 cycle, electric power supply.

Near the free end of the mandrel 46 are two rubber or rubber-like pads 96 and 98, which are gently and adjustably pressed against the mandrel with its plastic strip wound thereon as shown at 100. The adjustable pressure is obtained through the use of the screw adjustments 102 and 104 suitably threaded in support brackets 106 and 108.

To support the wound plastic spiral 109 as it leaves the mandrel, a trough 110 is provided. The trough 110 extends past the edge of the machine and directs the finished spiral into a collecting receptacle or cutting apparatus (not shown) at the will of the operator.

Having thus described the apparatus which uses my invention for the production of long spiral coils of plastic and similar materials, I will now describe the operation of the apparatus.

The plastic strip 44 is wound neatly on the spool 50 until a sufficient quantity has been accumulated on the spool 50 to permit operation of the machine for several hours or to produce the desired length of plastic coil. For the apparatus as heretofore described, the winding direction of the plastic strip 44 onto the spool 50 must be clockwise when viewed in the direction indicated by arrow 32. To accomplish this, the spool 50 is made to rotate counter-clockwise when viewed in the direction indicated by arrow 32. The rotation is accomplished by any suitable means (not shown).

The end of the plastic strip 44 is then threaded through the guide tube 42, the guide eyelet 48 and hand wrapped in a neat spiral around the mandrel 46 starting at a point as indicated in Figure 1 at 124. The point 124 is selected so that the angle $\theta$ included between the plastic strip 44 and a plane perpendicular to the mandrel axis is substantially the same or slightly greater than spiral angle of the spiral coil.

The spiral angle $\theta$ is as shown in Figure 5 and is here defined as the angle between a plane perpendicular to the spiral coil axis and the line of the edge of the plastic strip 44 when wound in the form of spiral shown in Figure 5.

After the mandrel 46 has been hand wrapped as described with the plastic strip 44, the rubber pads 96 and 98 are placed in position and using the adjustment screws 102 and 104 a moderate pressure is produced between the pads 96 and 98 and the plastic wrappings 109 on the mandrel 46. The final adjustment of this pressure will be made when the machine is operating.

The machine is now ready to be started. The starting is accomplished by energizing the following parts of the apparatus all at the same instant:
(1) The heater coil 84 is energized.
(2) The mandrel drive motor 70 is energized.
(3) The winding disc motor 24 is energized.

The electrical switching operations initiating the foregoing operations may be made with a single switch or with three separate switches. If three separate switches are used, the order of their operation for best results should be in the same order as given above.

For the first few revolutions of the winding disc 36 and until the heater coils 84 are up to temperature, an imperfect product will be produced. A product of high quality will emerge from the apparatus as soon as the temperature has been stabilized at a value sufficient to completely stress relieve the wound plastic strip; and upon adjustment of the pressure exerted by pads 96 and 98 to that which only gently impedes the motion of the plastic spiral; and with adjustment of the breaking force produced by pad 52 on spool 50 to produce sufficient tension in the strip 44 thus effecting a firm contact between the plastic strip and the threaded mandrel.

The proper rotational speeds for the mandrel 46 and the winding disc 36 should theoretically be in the ratio of the pitch of the spiral coil and the pitch of the thread on the mandrel. Thus if the finished spiral has four turns per inch and the mandrel has 24 threads per inch, the ratio of the rotation rates is as follows:

$$\frac{\text{Revolutions per minute of mandrel}}{\text{Revolution per minute of winding disc}} = \frac{\text{Mandrel threads per inch}}{\text{Spiral coil turns per inch}} = \frac{24}{4} = 6$$

Thus if the mandrel 46 is to be operated at 1800 R. P. M., the winding disc 36 should be rotated at 1800/6 or 300 R. P. M. I have found in practice, however, that whereas a theoretical ratio of 6 is indicated, the machine operates more reliably with a 10 or 20 percent increase in the ratio. Thus for the example cited (which is an actual operating example that I have selected as representative), the ratio of 6 increased by 20% becomes 7.2. The winding disc 36 speed would then be $$\frac{1800}{7.2} = 250 \text{ R. P. M.}$$

for an 1800 R. P. M. mandrel speed.

When the proper ratio of rotating speeds is so selected, the appearance of the plastic strip 44 on the mandrel 46 is as shown in Figure 5. It will be noted in Figure 5 that there is a spacing between the initial turns that gradually decreases with succeeding turns as shown in Figure 5 at 126, 127, 128 and 129. This condition appears to be caused by a slight increase in diameter of the spiral as the spiral proceeds through the heater. Simultaneously, the threads on the mandrel lose perfect contact with the plastic strip and some slippage seems to take place. Thus the spiral turns are compressed together in the approximate region of the heater coil 84.

The nature of thread which is machined onto the mandrel does not appear to be critical. I have found, however, that a thread of the type shown in Figure 4 works best for cellulose acetate plastic strip. The thread of Figure 4 is a non-symmetrical thread with the long sloping side 130 of the thread facing that end of the mandrel which is held in the chuck 80 of Figure 1. It is not necessary that the thread edge 131 be razor sharp. In fact, a slight dullness or rounded edge to the thread edge 131 reduces jamming occasioned by the wound plastic strip 109 "grabbing" the mandrel instead of slipping on it.

In some instances of operation, I have found it desirable to remove completely the mandrel threads at the take-off end of the mandrel adjacent to the rubber pads 96 and 98.

The relationship of the rubber pads 96 and 98 to the mandrel 46 and the wound plastic spiral 109 is as shown in Figure 6. Functionally the rubber pads 96 and 98 serve to prevent the rotation of the wound plastic strip 109 in the same direction of rotation as the mandrel 46. The pressure must not be so great, however, as to prevent the linear movement of the wound plastic spiral 109 off the end of the mandrel 46 under the compulsion of the threads on the mandrel. In practice I have found that a force of approximately a pound on each rubber pad is sufficient. Adjustment of the force is not critical.

I have found it desirable to cool the newly formed plastic spiral as quickly as possible after it leaves the mandrel 46 in order to harden the plastic spiral so that it can be handled. To accomplish the cooling I have provided an air blower at 140, supported by bracket 142 to machine base extension 15. The air blast from the blower is directed against the plastic spiral 109 by nozzle 144.

Having thus described my invention, I claim:

1. A machine for winding plastic spirals comprising a threaded mandrel; means for rotating said mandrel in one direction; plastic strip winding means adjacent said mandrel for winding the strip onto the mandrel at an angle to the mandrel axis; means for rotating said winding means in the opposite direction from said mandrel; the ratio of the rotational speed of the mandrel to the rotational speed of the winding means being at least as great as the ratio of the pitch of the formed plastic spiral to the mandrel thread pitch; plastic spiral heater means downstream from the winding means for relieving stress in the strip due to rotational influences from the winding means; and radially acting pressure means engageable with the spiral strip downstream from the heater means.

2. A machine for winding plastic spirals comprising a threaded mandrel; means for rotating said mandrel in one direction; plastic strip winding means adjacent said mandrel for winding the strip onto the mandrel at an angle to the mandrel axis; means for rotating said winding means in the opposite direction from said mandrel; plastic spiral heater means downstream from the winding means for relieving stress in the strip due to rotational influences from the winding means; and radially acting pressure means engageable with the spiral strip downstream from the heater means.

3. A machine for winding plastic spirals comprising a threaded mandrel; means for rotating said mandrel in one direction; plastic strip winding means adjacent said mandrel for winding the strip onto the mandrel at an angle to the mandrel axis; and means for rotating said winding means in the opposite direction from said mandrel; the ratio of the rotational speed of the winding means being at least as great as the ratio of the pitch of the formed plastic spiral to the mandrel thread pitch.

4. A machine for winding plastic spirals comprising a threaded mandrel; means for rotating said mandrel in one direction; plastic strip winding means adjacent said mandrel for winding the strip onto the mandrel at an angle to the mandrel axis; and means for rotating said winding means in the opposite direction from said mandrel.

5. A machine for winding plastic spirals comprising a threaded mandrel; means for rotating said mandrel in one direction; plastic strip winding means adjacent said mandrel for winding the strip onto the mandrel at an angle to the mandrel axis; means for rotating said winding means in the opposite direction from said mandrel; the ratio of the rotational speed of the mandrel to the rotational speed of the winding means being at least as great as the ratio of the pitch of the formed plastic spiral to the mandrel thread pitch; and plastic spiral heater means downstream from the winding means for relieving stress in the strip due to rotational influences from the winding means.

6. A machine for winding plastic spirals comprising a threaded mandrel; means for rotating said mandrel in one direction; plastic strip winding means adjacent said mandrel for winding the strip onto the mandrel at an angle to the mandrel axis; means for rotating said winding means in the opposite direction from said mandrel; and plastic spiral heater means downstream from the winding means for relieving stress in the strip due to rotational influences from the winding means.

7. A machine for winding plastic spirals comprising a threaded mandrel; means for rotating said mandrel in one direction; plastic strip winding means adjacent said mandrel for winding the strip onto the mandrel at an angle to the mandrel axis; means for rotating said winding means in the opposite direction from said mandrel; and plastic spiral heater means downstream from the winding means.

8. A machine for winding plastic spirals comprising a threaded mandrel; means for rotating said mandrel in one direction; plastic strip winding means adjacent said mandrel for winding the strip onto the mandrel at an angle to the mandrel axis; means for rotating said winding means in the opposite direction from said mandrel; plastic spiral heater means downstream from the winding means; and radially acting pressure means engageable with the spiral strip downstream from the heater means.

9. The method of winding plastic spirals comprising the steps of winding a plastic strip under tension around an oppositely rotating threaded mandrel; adjusting the ratio of the mandrel rotational speed to the plastic strip winder rotational speed to a value at least as great as the ratio of the formed plastic spiral pitch to the mandrel thread pitch; heating the formed spiral; and applying radial pressure to the spiral downstream from the heating point but while the spiral strip is still on the mandrel.

10. The method of winding plastic spirals comprising the steps of winding a plastic strip around an oppositely rotating threaded mandrel; heating the formed spiral; and applying radial pressure to the spiral downstream from the heating point.

11. The method of winding plastic spirals comprising the steps of winding a plastic strip under tension around an oppositely rotating threaded mandrel; heating the formed spiral; and applying radial pressure to the spiral downstream from the heating point.

12. The method of winding plastic spirals comprising the steps of winding a plastic strip around an oppositely rotating threaded mandrel; heating the formed spiral; and applying radial pressure to the spiral downstream from the heating point but while the spiral strip is still on the mandrel.

13. A machine for forming continuous plastic spirals comprising a rotary mandrel; movable plastic strip feed means mounted for rotary movement around the mandrel axis; power means for rotating said mandrel and feed means in opposite directions; means for controlling the ratio of the mandrel speed to the feed means speed at such value that the plastic strip is laid onto the mandrel at the same rate as it is removed by the spiral-conveying action of the mandrel; means cooperating with mandrel friction forces for maintaining the strip under slight tension as it is fed onto the mandrel; plastic strip heater means downstream from the point of entry of the strip; plastic strip cooler means downstream from the heater means; and radially acting pressure means engaged with the strip downstream from the heater means.

14. A machine for forming continuous plastic spirals comprising a rotary mandrel; movable plastic strip feed means mounted for rotary movement around the mandrel axis; power means for rotating said mandrel and feed means in opposite directions; means for controlling the ratio of the mandrel speed to the feed means speed at such value that the plastic strip is laid onto the mandrel at the same rate as it is removed by the spiral-conveying action of the mandrel; means cooperating with mandrel friction forces for maintaining the strip under slight tension as it is fed onto the mandrel.

15. A machine for forming continuous plastic spirals comprising a powered rotary mandrel having threads formed thereon; powered rotary means for feeding plastic strip material onto the rotary mandrel; the threads of the mandrel spiralling toward the downstream end of the mandrel counterclockwise relative to the direction of rotation of the mandrel, whereby to advance the plastic strip material from thread to thread; and means for controlling the ratio of the mandrel speed to the feed means speed at such value that the plastic strip is laid onto the mandrel at the same rate as it is removed by the spiral-conveying action of the mandrel, whereby the formed spiral is enabled to emerge from the mandrel with an entirely linear motion.

References Cited in the file of this patent

UNITED STATES PATENTS

| | | |
|---|---|---|
| 1,516,620 | Rankin | Nov. 25, 1924 |
| 2,269,185 | Dawson | Jan. 6, 1942 |
| 2,321,738 | Farny | June 15, 1943 |
| 2,339,121 | Van Cleef | Jan. 11, 1944 |
| 2,629,894 | Boggs | Mar. 3, 1953 |
| 2,678,677 | Hervey et al. | May 18, 1954 |
| 2,733,753 | Schlesselman et al. | Feb. 7, 1956 |

FOREIGN PATENTS

| | | |
|---|---|---|
| 716,826 | Great Britain | Oct. 13, 1954 |